United States Patent Office 3,772,331
Patented Nov. 13, 1973

3,772,331
1,3-DITHIETANES
Stanley A. Greenfield, Ambler, Pa., assignor to Rohm and Haas Company, Philadelphia, Pa.
No Drawing. Filed Dec. 21, 1970, Ser. No. 100,297
Int. Cl. C07d 69/00
U.S. Cl. 260—327 M              6 Claims

ABSTRACT OF THE DISCLOSURE

Novel 2-sulfonylimino-1,3-dithietanes and 2-methylene-1,3-diethietanes are described. These compounds, and related known ones, possess herbicidal, microbiocidal, molluscicidal and nematocidal properties.

---

This invention is concerned with biocidal compounds of the 1,3-dithietane class. They may be depicted by the general formula:

wherein X is
(a) An $R^1SO_2N=$ group wherein $R^1$ is alkyl of 1 to 12 carbon atoms; benzyl optionally substituted with lower alkyl, lower alkoxy, halogen preferably chlorine, and nitro groups; phenyl and phenyl substituted with lower alkyl, lower alkoxy, halogen preferably chlorine, and nitro groups; di(lower alkyl amino); 1-morpholinyl; 1-piperidyl and 1-pyrrolidyl groups, and
(b) an $R^2R^3C=$ group wherein $R^2$ is hydrogen, bromo, chloro, cyano, an $R^4OC(O)$-group wherein $R^4$ is a lower alkyl group, N-(3,4-dichlorophenyl)-carbamyl, N-(4-dimethylaminophenyl)-carbamyl or N-(4-nitrophenyl)carbamyl; when $R^2$ is hydrogen $R^3$ is cyano, nitro or an $R^5C(O)$-group wherein $R^5$ is a lower alkyl or a phenyl group; where $R^2$ is bromo or chloro $R^3$ is nitro; when $R^2$ is cyano $R^3$ is cyano, an $R^8OC(O)$-group wherein $R^8$ is a lower alkyl group, an $R^6NHC(O)$-group wherein $R^6$ is hydrogen or a lower alkyl group or an $R^7SO_2$ group wherein $R^7$ is phenyl, phenyl substituted with lower alkyl, lower alkoxy, halogen preferably chloro or nitro, or a lower alkyl group; when $R^2$ is an $R^4OC(O)$-group $R^3$ is an $R^9OC(O)$-group wherein $R^8$ is a lower alkyl group; when $R^2$ is N-(3,4-dichlorophenyl)-carbamyl, N-(4-dimethylaminophenyl)-carbamyl or N-(4-nitrophenyl)-carbamyl R3 is arenesulfonyl wherein arene is benzene, naphthalene or benzene substituted with lower alkyl, lower alkoxy, halogen preferably chloro, or nitro.

The novel compounds of this invention are of two main types:

(1) 2-sulfonylimino-1,3-dithietanes and
(2) 2-methylene-1,3-dithietanes.

The novel 2-sulfonyl-1,3-dithietanes have the general formula:

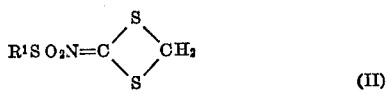

wherein $R^1$ is alkyl of 1 to 12 carbon atoms; benzyl optionally substituted with lower alkyl, lower alkoxy, halogen preferably chlorine, and nitro groups; phenyl substituted with lower alkyl, lower alkoxy, halogen preferably chlorine, and nitro groups; di(lower alkyl amino); 1-morpholinyl; 1-piperidyl and 1-pyrrolidyl groups.

The novel 2-methylene-1,3-dithietanes have the general formula

wherein $R^2$ is hydrogen, bromo, chloro, cyano, an $R^4OC(O)$-group wherein $R_4$ is a lower alkyl group, N-(3,4-dichlorophenyl)-carbamyl, N-(4-dimethylaminophenyl)-carbamyl or N-(4-nitrophenyl)-carbamyl; when $R^2$ is hydrogen $R^3$ is cyano, nitro or an $R^5C(O)$-group wherein $R^5$ is a lower alkyl group or a phenyl group; when $R^2$ is bromo or chloro $R^3$ is nitro; when $R^2$ is cyano $R^3$ is an $R^8OC(O)$-wherein $R^4$ is a lower alkyl group, an $R^6NHC(O)$-group wherein $R^6$ is hydrogen or a lower alkyl group, or an $R^7SO_2$ group wherein $R^7$ is phenyl, phenyl substituted with lower alkyl, lower alkoxy, halogen preferably chloro or nitro, or a lower alkyl group; when $R^2$ is an $R^4OC(O)$-group $R^3$ is an $R^9OC(O)$-group wherein $R^9$ is a lower alkyl group; when $R^2$ is N-(3,4-dichlorophenyl)-carbamyl, N-(4-dimethylaminophenyl)-carbamyl or N-(4-nitrophenyl)-carbamyl $R^3$ is arenesulfonyl wherein arene is benzene, naphthalene or benzene substituted with lower alkyl, lower alkoxy, halogen, preferably chloro, or nitro.

By lower alkyl, in the above group definitions, is meant an alkyl group, straight or branched chain, of 1 to 6 carbon atoms.

The 1,3-dithietanes are relatively unknown chemicals. Addor in the J. of Heterocyclic Chemistry 1, 381–7 (1970) gives a preparation of the 2-benzenesulfonylimino derivative. In U.S. Pat. 3,484,455 there are disclosed several 2-substituted imino-1,3-dithietanes wherein the substituents on the imino group are acyl, alkyl, aralkyl and aryl. The Republic of South African patent application 1064 (1968) discloses 2-phosphinylimino-1,3-dithietanes. The structure of the desaurins has been given a limited study. Chan et al. discusses the chemistry of the 2,4-bismethylene-1,3-dithietanes in Tetrahedron 26, 1493 (1970). Canadian Pat. 850,668 describes the properties of 2-cyanoimino-1,3-dithietane.

Exemplary compounds which fall within the defined class of 2-sulfonylimino-1,3-dithietanes are:

2-methylsulphonylimino-1,3-dithietane
2-isopropylsulphonylimino-1,3-dithietane
2-hexylsulphonylimino-1,3-dithietane
2-t-octylsulphonylimino-1,3-dithietane
2-nonylsulphonylimino-1,3-dithietane
2-dodecylsulphonylimino-1,3-dithietane
2-p-methylbenzylsulphonylimino-1,3-dithietane
2-o-chlorobenzylsulphonylimino-1,3-dithietane
2-m-bromobenzylsulphonylimino-1,3-dithietane
2-p-nitrobenzylsulphonylimino-1,3-dithietane
2-p-t-butylphenylsulphonylimino-1,3-dithietane
2-p-fluorophenylsulphonylimino-1,3-dithietane
2-m-nitrophenylsulphonylimino-1,3-dithietane
2-diethylaminosulphonylimino-1,3-dithietane
2-methylethylaminosulphonyl-1,3-dithietane
2-dihexylaminosulphonylimino-1,3-dithietane
2-(1-morpholinyl)sulphonylimino-1,3-dithietane Exemplary compounds which fall within the defined class of 2-methylene-1,3-dithietanes are:

2-acetylmethylene-1,3-dithietane
2-propionylmethylene-1,3-dithietane
2-butyrylmethylene-1,3-dithietane
2-isobutyrylmethylene-1,3-dithietane
2-pentanoylmethylene-1,3-dithietane
2-hexanoylmethylene-1,3-dithietane
2-cyano(methoxycarbonyl)methylene-1,3-dithietane 2-cyano(propoxycarbonyl)methylene-1,3-dithietane
2-cyano(isopropoxycarbonyl)methylene-1,3-dithietane
2-cyano(butoxycarbonyl)methylene-1,3-dithietane
2-cyano(t-butoxycarbonyl)methylene-1,3-dithietane
2-cyano(pentoxycarbonyl)methylene-1,3-dithietane
2-cyano(hexoxycarbonyl)methylene-1,3-dithietane
2-cyano(carbamyl)methylene-1,3-dithietane
2-cyano(methylcarbamyl)methylene-1,3-dithietane
2-cyano(ethylcarbamyl)methylene-1,3-dithietane
2-cyano(propylcarbamyl)methylene-1,3-dithietane
2-cyano(hexylcarbamyl)methylene-1,3-dithietane The 2 - sulfonylimino-1,3-dithietanes of this invention may be made by the following sequence of reactions:

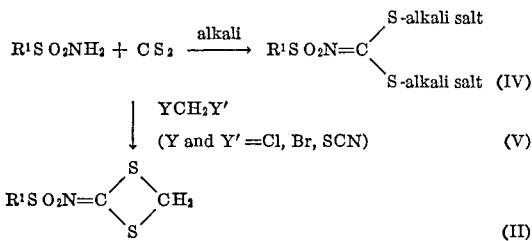

wherein $R^1$ is as defined above.

The general method is known from U.S. Pat. 3,322,788 in the preparation of $RSO_2N=C(SNa)_2$ and $RSO_2N=C(SK)_2$ compounds and subsequent alkylations.

The reaction of a sulfonamide with $CS_2$ and sodium or potassium hydroxide is preferably run in the presence of a solvent. Suitable solvents are dimethylformamide and dimethylsulfoxide. A temperature in the range of $-10°$ to $50°$ C. is suitable, but a range of $10–30°$ C. is preferred.

The reaction of a compound of Formula IV with a methylene dihalide or halothiocyanate is usually run in a solvent, e.g. an aromatic hydrocarbon such as benzene, a ketone such as acetone, a nitrile such as acetonitrile, dimethylformamide or dimethylsulfoxide. Compounds of Formula V, $YCH_2Y'$, which are suitable for the reaction include methylene bromide, methylene chloride, methylene iodide and chloromethyl thiocyanate. Temperatures in the range of 20–200° C. may be used and the refluxing temperature of the reaction mixture is often used with a range of 50–150° C. being preferred.

The use of chloromethyl thiocyanate is a novel procedure which results in enhanced yields of the desired dithietane. For example, Addor in J. of Het. Chem. 7, 381 (1970) reports a yield of 2-benzenesulfonylimino-1,3-dithietane of 2% when methylene bromide was used as the alkylating agent. The same reaction when chloromethyl thiocyanate was used in this study gave a 29% yield of the same product. Other examples of an increased yield when chloromethyl thiocyanate is used are given below.

Another procedure whereby 2-sulfonylimino-1,3-dithietanes of Formula II may be made is by reaction of a sulfonyl halide, e.g. a sulfonyl chloride, with 2-imino-1,3-dithietane or its salts. The reaction may be illustrated by the following scheme:

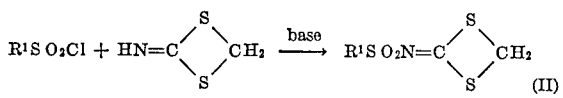

The reaction may be run in aqueous solution or in organic solvents such as an aromatic hydrocarbon, a ketone, or dimethylformamide. Typical bases which may be used include sodium or potassium hydroxide or carbonate, sodium acetate, alkaline earth carbonates or tertiary amines such as triethylamine. Example 5 of U.S. Pat. 3,484,455 describes a method for preparing 2-imino-1,3-dithietane hydrochloride by hydrolysis of 2-diethoxyphosphinylimino-1,3-dithietane with concentrated hydrochloric acid.

The 2-methylene-1,3-dithietanes of this invention may be made by the following procedure:

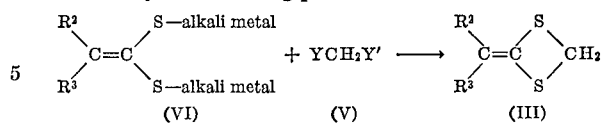

The definitions of $R^2$, $R^3$, Y and Y' are as given above.

Any active methylene compound which will react with carbon disulfide and a base will give a compound of the type of Formula VI. Active methylene compounds of this type include $NO_2CH_3$, $(NC)_2CH_2$, $R^8OC(O)CH_2CN$, $R^8OC(O)CH_2C(O)OR^8$, $R^5C(O)CH_3$,

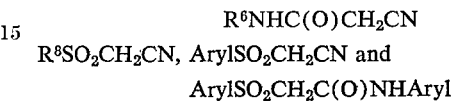

$R^8SO_2CH_2CN$, $ArylSO_2CH_2CN$ and $ArylSO_2CH_2C(O)NHAryl$ wherein $R^8$, $R^5$ and $R^6$ have the above meanings.

The preparation of di-alkali metal salts of 1,1-dimercapto-2,2-dicyanoethylene as described in U.S. Pat. 2,533,233 and discussed by Dittmer et al. in J. Organic Chemistry 29, 497 (1964) is typical of the preparation of compounds of Formula VI. The reaction of the compounds of Formula VI with $YCH_2Y'$ compounds to produce compounds of Formula III is as described above for the preparation of Formula II with $YCH_2Y'$ compounds.

The following examples are presented in order to illustrate the typical methods of preparation and are not intended to limit the invention.

EXAMPLE 1

Preparation of 2-methylsulfonylimino-1,3-dithietane

A slurry of dipotassium N-(methylsulfonyl)dithioimidocarbonate (20.8 g., 0.084 mole) made by the method of Hartke, Arch. Pharm. 299, 174 (1966), chloromethyl thiocyanate (10 g., 0.092 mole) and acetone (125 ml.) was stirred at reflux for 4 hours then overnight at ambient temperature. The reaction mixture was filtered and acetone was stripped from the filtrate. The residue was taken up in chloroform (250 ml.) washed twice with water, dried over sodium sulfate and the chloroform stripped off to give 11 g. of crude solid. This was recrystallized from ethanol with charcoaling to give 8.3 g. of solid melting at 125–127° C. This is a 54% yield of 2-methylsulfonylimino-1,3-dithietane.

The above reaction was repeated using methylene iodide instead of chloromethyl thiocyanate and acetonitrile instead of acetone. The reaction mixture was refluxed 48 hrs. after which the product was isolated as above to give a 19% yield of recrystallized 2-methylsulfonylimino-1,3-dithietane.

EXAMPLE 2

Preparation of 2-ethylsulfonylimino-1,3-dithietane (a) Preparation of dipotassium N-(ethylsulfonyl)dithioimidocarbonate: To a slurry containing ethanesulfonamide (50.0 g., 0.459 mole), potassium hydroxide (25.6 g., 0.459 mole) and dimethyl formamide (300 ml.) was added carbon disulfide (34.8 g., 0.459 mole). The resulting red slurry was stirred for 2 hours maintaining the temperature below 35° C. Additional potassium hydroxide (25.6 g. or 0.459 mole) was then added. The temperature rose to 50° C. with the formation of a clear solution. After one hour, the temperature returned to ambient temperature, with formation of a precipitate. The precipitate was filtered, washed with dimethyl formamide and dried in the vacuum oven to give 95.8 g. of dipotassium N-(ethylsulfonyl)dithioimidocarbonate melting at 213–217° C.

(b) Preparation of 2-ethylsulfonylimino-1,3-dithietane: A slurry of dipotassium N-(ethylsulfonyl)dithioimidocarbonate (20 g., 0.0766 mole), chloromethyl thiocyanate (9.9 g., 0.0919 mole) and acetone (175 ml.) was stirred at reflux for 2 hours then at ambient temperature for 16 hours. The reaction mixture was filtered and acetone was stripped from the filtrate. The residue was taken up in chloroform, washed with water, dried and the chloroform stripped off. The residue was recrystallized from ethanol to give 1.2 g. (8%) of 2-ethylsulfonylimino-1,3-dithietane.

EXAMPLE 6

Preparation of 2-benzenesulfonylimino-1,3-dithietane

Chloromethyl thiocyanate (7.2 g., 0.0674 mole) was added to a slurry of dipotassium N-(phenylsulfonyl) dithioimidocarbonate (10 g., 0.0324 mole). After the reaction proceeded at ambient temperature for two hours, the reaction mixture was diluted with water (200 ml.) and the resulting solid was collected. The crude reaction product was washed with water and recrystallized from ethanol to give 2.3 g. (29%) of 2-benzenesulfonylimino-1,3-dithietane.

EXAMPLE 7

Preparation of 2-p-nitrophenylsulfonylimino-1,3-dithietane

Sodium bicarbonate (2.96 g., 0.0353 mole) was added portionwise at 5° C. to a slurry of 2-imino-1,3-dithietane hydrochloride (2.5 g., 0.0176 mole), and p-nitrobenzenesulfonyl chloride (4.72 g., 0.0214 mole) in acetone (150 ml.). The stirring was continued at 5° C. for 30 minutes and then at ambient temperatures for 18 hours. After filtration and solvent removal, the residue was dissolved in chloroform (400 ml.) and washed twice with 5% aqueous hydrochloric acid (50 ml.), water, 5% aqueous sodium hydroxide, and water. After solvent removal, the residual material was recrystallized from ethanol to give 2.7 g. (53%) of 2-p-nitrophenylsulfonylimino - 1,3 - dithietane melting at 170–172° C.

EXAMPLE 12

Preparation of 2-nitromethylene-1,3-dithietane

An acetone (200 ml.) slurry of dipotassio-1,1-dithio-2-nitro-ethylene (21.3 g., 0.1 mole) and chloromethyl thiocyanate (10.7 g., 0.1 mole) was refluxed for 2 hours and allowed to proceed at ambient temperature for an additional eighteen hours Additional chloromethyl thiocyanate (10.7 g., 0.1 mole) was added and the slurry refluxed for an additional eight hours and then allowed to proceed at ambient temperature for eighteen hours. The slurry was filtered and the filtrate was evaporated. The resulting solid material was extracted with hot chloroform. The chloroform was evaporated and the residue was recrystallized twice from ethanol to give 2.0 g. (13%) of 2-nitromethylene-1,3,-dithietane melting at 169–170° C.

EXAMPLE 13

Preparation of 2-acetonylidene-1,3-dithietane

A mixture of acetone (14.5 g., 0.25 mole) and carbon disulfide (19.0 g., 0.25 mole) was added dropwise at 10° C. to a slurry of potassium-t-butoxide (56.0 g., 0.5 mole) in benzene (500 ml.). The slurry was stirred at ambient temperature for eighteen hours, and then methylene iodide (134.0 g., 0.5 mole) was added. After stirring at ambient temperature for one hour, the mixture was heated on a steam bath for two hours. After stirring for eighteen additional hours at ambient temperature, the reaction mxiture was filtered and the filtrate was removed. Residual methylene iodide was removed by vacuum distillation. The residue was dissolved in chloroform, washed with 2% aqueous hydrochloric acid, water, 2% aqueous sodium hydroxide, water, dried over sodium sulfate, and the solvent removed to leave 6.0 g. (16%) of an oil, which is 2-acetonylidene-1,3-dithietane.

EXAMPLE 17

Preparation of 2-(carbamyl-cyanomethylene) 1,3-dithietane

An acetonitrile (100 ml.) slurry of dipotassio-1,1-dithio-2-carbamyl-2-cyano-ethylene (23.6 g., 0.1 mole) and methylene iodide (26.8 g., 0.1 mole) was heated to reflux for eighteen hours. The slurry was filtered and the solids extracted with additional acetonitrile (100 ml.). The combined acetonitrile solutions were evaporated to dryness. The residue was treated with hot acetone and charcoal and then diluted with ether until precipitation commenced. The precipitate was filtered, the filtrate evaporated and the residue was crystallized twice from ethanol to give 1.45 g. (8%) of 2-(carbamyl-cyanomethylene)-1,3-dithietane melting at 205–206° C.

EXAMPLE 25

Preparation of 2-bromonitromethylene-1,3-dithietane

To a solution of 2-nitromethylene-1,3-dithietane (5 g., 0.0336 mole) in chloroform (1 l.) was added a solution of bromine (5.37 g., 0.0336 mole) in chloroform (50 ml.) dropwise. The solution was stirred 18 hrs. and the solvent removed to leave 7.5 g. of solid residue. This was recrystallized from ethanol to give 2 g. of 2-bromonitromethylene-1,3-dithietane.

Table I below gives details on typical preparations of 2-sulfonylimino-1,3-dithietanes. Table II below gives details on typical preparations of 2-methylene-1,3-dithietanes.

TABLE I

Physical Constants of 2-Sulfonylimino-1,3-Dithietanes $$R^1SO_2N=C\underset{S}{\overset{S}{\diamond}}CH_2$$

| | | Melting point, °C. | Empirical formula | Found | | | | | Theory | | | | |
|---|---|---|---|---|---|---|---|---|---|---|---|---|---|
| Ex. | $R^1$ | | | C | H | N | O | S | C | H | N | O | S |
| 1 | $CH_3$ | 126–127 | $C_3H_5NO_2S_3$ | 19.7 | 2.9 | 7.5 | 17.8 | 52.5 | 19.6 | 2.7 | 7.7 | 17.5 | 52.5 |
| 2 | $C_2H_5$ | 64–66 | $C_4H_7NO_2S_3$ | 24.6 | 3.6 | 7.0 | 16.2 | 48.6 | 24.4 | 3.5 | 7.1 | 16.2 | 48.7 |
| 3 | $n-C_3H_7$ | 60–61 | $C_5H_9NO_2S_3$ | 28.2 | 4.4 | 6.5 | 15.5 | 45.7 | 28.4 | 4.2 | 6.6 | 15.2 | 45.5 |
| 4 | $n-C_8H_{17}$ | 54–55 | $C_{10}H_{19}NO_2S_3$ | 42.9 | 6.9 | 5.0 | 11.6 | 34.1 | 42.7 | 6.7 | 5.0 | 11.4 | 34.2 |
| 5 | $C_6H_5CH_2$ | 89–90 | $C_9H_9NO_2S_3$ | 41.8 | 3.6 | 5.4 | 13.8 | 36.3 | 41.8 | 3.5 | 5.4 | 12.3 | 37.0 |
| 6 | $C_6H_5$ | 119–121 | (1) | | | | | | | | | | |
| 7 | $4-NO_2C_6H_4$ | 171–172 | $C_8H_6N_2O_4S_3$ | 33.7 | 2.2 | 9.6 | 22.3 | 32.1 | 33.1 | 2.1 | 9.6 | 22.1 | 33.1 |
| 8 | $4-ClC_6H_4$ | 140–141 | $C_8H_6ClNO_2S_3$ | 34.5 | 2.3 | 5.1 | 11.7 | 32.7 | 34.4 | 2.1 | 5.0 | 11.5 | 34.4 |
| 9 | $4-CH_3C_6H_4$ | 147–149 | $C_9H_9NO_2S_3$ | 41.6 | 3.6 | 5.3 | 11.9 | 34.1 | 41.7 | 3.5 | 5.3 | 12.4 | 37.1 |
| 10 | ⬡N | 78–79 | $C_7H_{12}N_2O_2S_3$ | 33.7 | 5.0 | 11.2 | 13.1 | 36.5 | 33.3 | 4.8 | 11.1 | 12.7 | 38.1 |
| 11 | $(CH_3)_2N$ | 79–80 | $C_4H_8N_2O_2S_3$ | 23.1 | 4.1 | 13.1 | 15.1 | 45.2 | 22.6 | 3.8 | 13.2 | 15.2 | 45.3 |

[1] J. Heterocyclic Chem. 7, 381 (1970).

TABLE II
Physical Constants of 2-Methylene-1,3-Dithietanes

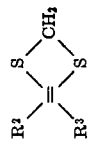

| Ex. | R² | R³ | Melting point, °C | Empirical formula | Found C | H | N | O | S | Cl | Br | Theory C | H | N | O | S | Cl | Br |
|---|---|---|---|---|---|---|---|---|---|---|---|---|---|---|---|---|---|---|
| 12 | H | NO₂ | 167–169 | C₄H₃NO₂S₂ | 24.4 | 2.0 | 9.0 | 21.3 | 43.3 | | | 24.1 | 2.0 | 9.4 | 21.5 | 43.0 | | |
| 13 | H | CH₃CO | conc. | C₅H₆OS₂ | 41.2 | 4.3 | | 11.1 | 43.7 | | | 41.1 | 4.1 | | 11.0 | 43.8 | | |
| 14 | H | C₆H₅CO | 119–121 | C₁₀H₈OS₂ | 57.6 | 3.8 | | 8.7 | 30.7 | | | 57.6 | 3.8 | | 7.7 | 30.8 | | |
| 15 | CN | CN | 139–140 | (¹) | | | | | | | | | | | | | | |
| 16 | CN | C₂H₅OCO | 114–115 | C₇H₇NO₂S₂ | 41.9 | 3.6 | 6.9 | 16.6 | 32.4 | | | 41.8 | 3.5 | 7.0 | 15.9 | 31.8 | | |
| 17 | CN | NH₂CO | 205–206 | C₅H₄N₂OS₂ | 35.2 | 2.5 | 16.0 | 9.9 | 37.4 | | | 34.9 | 2.3 | 16.3 | 9.3 | 37.2 | | |
| 18 | CN | NH₂CS | 214–215 | C₅H₄N₂S₃ | 31.7 | 2.1 | 14.1 | | 47.2 | | | 31.9 | 2.1 | 14.9 | | 51.0 | | |
| 19 | CN | C₆H₅NHCO | 130–131 | C₁₁H₈N₂OS₂ | 47.7 | 3.3 | 12.2 | 8.3 | 27.5 | | | 47.4 | 3.2 | 11.3 | 7.0 | 28.0 | | |
| 20 | CN | C₆H₅SO₂ | 179–180 | C₁₀H₇NO₂S₃ | 44.3 | 2.6 | 5.2 | 12.5 | 35.9 | | | 44.3 | 2.6 | 5.2 | 11.9 | 35.7 | | |
| 21 | CN | 4-CH₃C₆H₄SO₂ | 233–235 | C₁₁H₈N₂O₂S₃ | 47.9 | 3.1 | 4.9 | 19.2 | 21.7 | | | 48.3 | 3.1 | 6.2 | 19.7 | 22.5 | | |
| 22 | 4-NO₂C₆H₄NHCO | 4-CH₃C₆H₄SO₂ | >250 | C₁₇H₁₄N₂O₅S₃ | 46.0 | 3.2 | 6.7 | 18.6 | 22.0 | | | 47.1 | 2.9 | 6.6 | 19.6 | 23.5 | | |
| 23 | 4-NO₂C₆H₄NHCO | 4-CH₃C₆H₄SO₂ | 184–185 | C₁₇H₁₃ClN₂O₅S₃ | 46.0 | 3.1 | 6.9 | 18.7 | 20.8 | 16.2 | | 45.8 | 2.9 | 6.9 | 19.0 | 20.8 | 15.9 | |
| 24 | 3,4-Cl₂C₆H₃NHCO | 4-CH₃C₆H₄SO₂ | 191–193 | C₁₉H₁₆N₂O₃S₃ | 54.1 | 5.0 | 6.1 | 10.7 | 22.9 | | | 54.8 | 4.8 | 6.7 | 11.4 | 22.8 | | |
| 25 | 4-(CH₃)₂NC₆H₄NHCO | NO₂ | 147–149 | C₅H₂BrNO₂S₂ | 16.6 | 1.0 | | 14.3 | 28.4 | | 32.7 | 15.8 | 0.9 | | 14.0 | 28.0 | | 35.2 |
| 26 | Br | C₂H₅OCO | 104–105 | C₆H₁₂O₄S₂ | 43.9 | 4.9 | | 25.8 | 25.5 | | | 43.6 | 4.8 | | 25.8 | 25.6 | | |
| 27 | C₂H₅OCO | CH₃SO₂ | 177–178 | C₅H₆NO₂S₃ | 29.1 | 2.3 | 6.8 | 16.3 | 46.4 | | | 29.0 | 2.4 | 6.8 | 15.4 | 46.4 | | |

¹ J. Org. Chem. 29, 497 (1964).

The compounds of this invention are useful as biocides and in particular have exhibited excellent herbicidal, microbicidal, molluscicidal and nematocidal activity. For convenience these compounds will at times be referred to generally as 1,3-dithietanes.

The compositions of the invention when used as agricultural pesticides comprise a 1,3-dithietane together with an agronomically acceptable carrier. By "an agronomically acceptable carrier" is meant any substance which can be used to dissolve, disperse, on diffuse the chemical within it, without impairing the effectiveness of the toxic agent, which is not permanently deleterious to the soil in any chemical or physical manner and which is usually non-phytocidal to the agricultural crops to be protected. The compositions may be in the form of solutions, emulsifiable concentrates, wettable powders, granules, or dusts. One or more liquid or solid carriers may be used for a particular herbicidal composition.

An emulsifiable concentrate is made by dissolving a 1,3-dithietane in a solvent to which one or more surfactants are added. Suitable solvents or liquid carriers for use in preparing these emulsifiable concentrates may, for example, be found in the hydrocarbon and ketone classes of organic solvents such as xylene, acetone, isophorone, mesityl oxide, cyclohexanone and mixtures of these. Preferred solvents are ketone-hydrocarbon mixtures such as isophorone-xylene. The emulsifying agents used are surfactants of the anionic, cationic, or non-ionic types and mixtures thereof. Representative of the anionic surfactants are fatty alcohol sodium sulfates, calcium alkylbenzensulfonates and sodium dialkyl sulfosuccinates. Representative of the cationics are (higher alkyl) dimethylbenzylammonium chlorides. Representative of the nonionics are condensation products of alkylene oxides with fatty alcohols, alkyl phenols, mercaptans, amines or fatty acids, such as dinonylphenoxypolyethoxyethanol in which there are 8 to 100 ether groupings and similar polyethoxy compounds prepared with other hydrophilic groupings, including esters of long chain fatty acids and mannitan or sorbitan, which are reacted with ethylene oxide.

The following compositions are typical of emulsifiable concentrate formulations when solvents are used.

| | Parts/100 parts total |
|---|---|
| 1,3-dithietane | 10–35 |
| Solvent | 55–88 |
| Emulsifying agent | 2–10 |

Wettable powder formulations comprise a 1,3-dithietane admixed in a solid carrier along with a surface active agent(s) which gives this type of formulation its wettability, dispersibility and spreading characteristics. Solid carriers which are suitable for preparing these wettable powder formulations are those which have been rendered agronomically suitable by pulverizing devices and may be organic or inorganic in nature. Suitable organic carriers are soybean, walnut or wood flower or tobacco dust; and suitable inorganic ones are clays of the montmorillonite (bentonite), kaolinite or fuller's earth types; silicas such as diatomaceous earth and hydrated silica; silicates such as talc, pyrophylite, or alkaline earth silicates, and calcium and magnesium carbonates. A surfactant or mixture of surfactants is added to the wettable powder formulation. Suitable dispersing agents are sodium lignin sulfonate, sodium formaldehyde-naphthalene sulfonate, or sodium N-methyl-N-higher alkyl taurates. Wetting agents useful for this purpose include higher alkylaryl sulfonates such as calcium dodecylbenzenesulfonate, long-chain alcohol sulfates, sodium alkylphenoxypolyethoxyethyl sulfonates, sodium dioctyl sulfosuccinate, and ethylene oxide adducts with fatty alcohols or with higher alkylphenols, such as octylphenoxypolyethoxyethanol in which there are 8 to 80 ether groupings and similar polyethoxy compounds made from stearyl alcohol. Operative spreading or adhesive agents include glycerol mannitan laurate or a condensate of polyglycerol and oleic acid modified with phthalic anhydride. Additionally, many of the surfactants discussed above function as spreading and adhesive agents. The active ingredient content of the wettable powders may be in the range of about 20 to 80%; however, the preferred range of concentration is 50 to 75%.

The following compositions are typical for wettable powder formulations:

| | Parts/100 parts total |
|---|---|
| 1,3-dithietane | 20–80 |
| Carrier | 10–79 |
| Surfactants | 1–10 |

Dust concentrates are made by incorporating a 1,3-dithietane of this invention into a solid carrier such as finely powdered clays, talc, silica and synthetic silicates, alkaline earth carbonates and diluents of natural origin, such as tobacco dust or walnut shell flour. Granular formulations are made from similar type solid carriers except that the particle size is larger, in the range of 15 to 60 mesh. A small amount of dispersing agent may be incorporated into these solid formulations. The concentration of active ingredients in these dust or granular formulations may be in the range of 2 to 15%.

It will be seen from the above that the compositions of this invention may contain 20% to 98% of carrier based on the total weight of the composition, depending on whether it is in the form of a solution, an emulsifiable concentrate, a wettable powder, a dust or a granular formulation. Solutions containing a relatively high percentage of the active ingredient are used for applications by a low volume technique.

A particularly convenient method for making solid formulations is to dissolve the active ingredient in a volatile solvent, such as acetone; apply this solution to the solid carrier with thorough mixing, and then remove the solvent by allowing it to evaporate at either normal or reduced pressure.

The compounds of this invention were evaluated in standard greenhouse tests. For these tests, seeds of selected crops and weeds were planted in soil. For preemergence tests, the pots or flats were treated immediately with the test compound. For postemergence tests, the seeds were allowed to germinate and the plants to grow for two weeks at which time they were treated by foliar application with the test chemical. In the preliminary evaluation, the rate of application was 10 pounds per acre (11 kilos per hectare) using four representative monocotyledonous plants, viz.

barnyardgrass (*Echinochloa crusgalli*),
crab grass (*Digitaria sanguinalis*),
Johnsongrass (*Sorghum halepense*) and
wild oat (*Avena fatua*), and four representative dicotyledonous plants, viz.

bindweed (*Convolvulus arvensis*)
curly dock (*Rumex crispus*)
velvetleaf (*Abutilon theophrasti*) and
wild mustard (*Brassica kaber*).

In a secondary herbicidal evaluation additional plant species were planted in flats. For the monocotyledonous plants these included:

Bermudagrass (*Cynodon dactylon*),
downy brome (*Bromus tectorum*),
foxtail (*Setaria glauca*),
nutsedge (*Cyperus esculentus*),
quackgrass (*Agropyron repens*),
ryegrass (*Lolium multiflorum*) and
witchgrass (*Panicum capillare*).

For the dicotyledonous plants these included:

cocklebur (*Xanthium pensylvanicum*),
lambsquarters (*Chenopodium album*),
morningglory (*Ipomoea purpurea*),
pigweed (*Amaranthus retroflexus*),
smartweed (*Polygonum pensylvanicum*) and
wild carrot (*Daucus carota*).

In these standard greenhouse tests the percent control for each plant was read two weeks after treatment and the values reported as an average percent control for the monocotyledons (M) and the dicotyledons (D). Table III gives the results.

TABLE III

Herbicidal Evaluations on 1,3-dithietanes

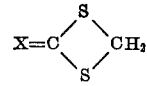

| | Herbicidal, percent control | | | |
|---|---|---|---|---|
| | Preemergence | | Postemergence | |
| Example | 10 lbs./a. | 4 lbs./a. | 10 lbs./a. | 4 lbs./a. |
| 1. M | 70 | 32 | 77 | 42 |
| D | 97 | 67 | 95 | 80 |
| 2. M | 67 | 2 | 77 | 42 |
| D | 75 | 33 | 97 | 75 |
| 3. M | 70 | 5 | 80 | 45 |
| D | 87 | 28 | 100 | 73 |
| 4. M | 0 | 0 | 45 | 6 |
| D | 22 | 0 | 70 | 10 |
| 5. M | 30 | 0 | 60 | 2 |
| D | 27 | 0 | 67 | 2 |
| 6. M | 25 | 5 | 30 | 0 |
| D | 62 | 11 | 50 | 11 |
| 7. M | 0 | 0 | 50 | 0 |
| D | 0 | 0 | 70 | 0 |
| 8. M | 22 | 0 | 7 | 0 |
| D | 0 | 0 | 25 | 0 |
| 9. M | 22 | 0 | 85 | 0 |
| D | 0 | 0 | 87 | 0 |
| 10. M | 0 | 6 | 62 | 3 |
| D | 30 | 16 | 82 | 14 |
| 11. M | 25 | 5 | 67 | 6 |
| D | 35 | 12 | 95 | 36 |
| 12. M | 82 | 13 | 65 | 36 |
| D | 92 | 40 | 92 | 57 |
| 13. M | 0 | 0 | 42 | 0 |
| D | 25 | 0 | 62 | 6 |
| 14. M | 0 | 0 | 30 | |
| D | 0 | 0 | 92 | |
| 15. M | 75 | 26 | 87 | 51 |
| D | 100 | 35 | 95 | 91 |
| 16. M | 0 | 0 | 45 | 8 |
| D | 25 | 0 | 72 | 15 |
| 17. M | 37 | 0 | 42 | 0 |
| D | 77 | 0 | 92 | 17 |
| 18. M | 0 | | 0 | |
| D | 30 | | 2 | |
| 19. M | 0 | 0 | 30 | 0 |
| D | 0 | 0 | 52 | 0 |
| 20. M | 0 | | 5 | |
| D | 0 | | 32 | |
| 21. M | 0 | | 25 | |
| D | 7 | | 32 | |
| 22. M | 0 | | 5 | |
| D | 0 | | 27 | |
| 25. M | 50 | 0 | 97 | 17 |
| D | 50 | 0 | 97 | 25 |

Representative compounds of this invention have demonstrated excellent control of aquatic weeds. For this test submersed species of aquatic weeds were planted in 1.5 inch pots in a 50:50 mixture of sand and soil and the pots placed in a one-gallon jar. Water (3000 ml.) was added. Floating species of aquatic weeds were then placed on the top of the water. The jars were held for two weeks during which time water lost by evaporation was replaced at weekly intervals. The test compound was dissolved in acetone and amounts of this solution were then added to the jar such that the concentration of the compound in the water was in varying ranges from 0.5 to 10 p.p.m. Two weeks after treatment the percent control was read.

The following aquatic weed species were used:

Floating species:
 A azolla *Azolla caroliniana*
 B duckweed *Lemna minor*
 C Spirodela *Spirodela polyrhiza*
 D Salvinia *Salvinia rotundifolia*
 E water fern *Ceratopteris thalictroides*

Submersed species:
 F cattail *Typha latifolia*
 G Elodea *Elodea canadensis*
 H Ludwigia *Ludwigia spp.*

Table IV gives the results.

TABLE IV.—AQUATIC WEED CONTROL

| Ex. | Rate, p.p.m. | A Azolla | B Duck-weed | C Spiro-dela | D Sal-vinia | E Water fern | F Cat-tail | G Elodea | H Lud-wigia |
|---|---|---|---|---|---|---|---|---|---|
| 1 | 5 | 100 | 65 | | 100 | | 80 | 95 | 50 |
| 4 | 0.5 | 75 | 60 | | 90 | 25 | 40 | 25 | 70 |
|   | 2.5 | 100 | 95 | | 100 | 95 | 90 | 80 | 95 |
|   | 5 | 100 | 90 | | 100 | 100 | 0 | 40 | 50 |
| 5 | 5 | 100 | 15 | | 100 | 80 | 0 | 80 | 50 |
| 7 | 0.5 | 25 | 40 | | 100 | 0 | 75 | 0 | 25 |
|   | 2.5 | 95 | 95 | | 100 | 80 | 100 | 90 | 80 |
|   | 5 | 100 | 90 | | 90 | | 60 | 80 | 60 |
| 9 | 0.5 | 85 | 95 | | 60 | 30 | 0 | 0 | 0 |
|   | 2.5 | 100 | 95 | | 100 | 100 | 100 | 50 | 95 |
|   | 5 | 100 | 50 | | 100 | | 100 | 50 | 100 |
| 10 | 5 | 100 | 50 | | 50 | 0 | 0 | 0 | 50 |
| 11 | 0.5 | 0 | 20 | | 25 | 0 | 100 | 30 | 60 |
|   | 2.5 | 55 | 40 | | 45 | 40 | 85 | 50 | 70 |
|   | 5 | 70 | 80 | | 70 | 50 | 75 | 85 | 85 |
| 13 | 5 | 0 | 0 | | 0 | | 0 | 0 | 30 |
| 15 | 0.5 | 100 | 100 | | 100 | 30 | 0 | 25 | 0 |
|   | 2.5 | 100 | 100 | | 100 | 92 | 0 | 95 | 50 |
|   | 5 | 100 | 100 | | 100 | | 25 | 85 | 40 |
| 16 | 0.5 | 100 | 98 | | 45 | 15 | 15 | 15 | 0 |
|   | 2.5 | 100 | 100 | | 100 | 45 | 75 | 50 | 55 |
|   | 5 | 100 | 100 | | 100 | | 90 | 100 | 50 |
| 17 | 5 | 100 | 100 | | 80 | | 70 | 0 | 15 |
| 18 | 1 | 35 | | 90 | 60 | 0 | 30 | 0 | 0 |
|   | 5 | 85 | | 100 | 95 | 60 | 80 | 65 | 0 |
|   | 10 | 100 | | 100 | 100 | 85 | 90 | 80 | 80 |
| 19 | 5 | 65 | 35 | | 85 | 25 | 0 | 80 | 50 |
| 20 | 1 | 80 | | 95 | 85 | 45 | 0 | 55 | 0 |
|   | 5 | 100 | | 100 | 100 | 80 | 30 | 70 | 40 |
|   | 10 | 100 | | 100 | 100 | 100 | 60 | 80 | 60 |
| 21 | 1 | 0 | | 0 | 0 | 0 | 0 | 0 | 0 |
|   | 5 | 40 | | 0 | 20 | 0 | 0 | 0 | 0 |
|   | 10 | 70 | | 0 | 30 | 30 | 0 | 35 | 0 |

The compounds of this invention have been found to possess excellent molluscicidal activity.

Evaluations were made on the *Biomphalaria glabratus*, a known vector of schistosomiasis or bilharziasis. Young snails (5–10 mm. diameter) were exposed to aqueous dispersions containing various concentrations of the 1,3-dithietane. For this test five to ten snails were placed in 6 oz. cups containing 100 ml. of the dispersion prepared with non-chlorinated water. After a 24-hour exposure period followed by a 24-hour recovery period in untreated, non-chlorinated water the percent mortality was determined.

The results of the test are summarized in Table V. The concentrations are given in parts per million (p.p.m.).

TABLE V.—MOLLUSCICIDAL ACTIVITY

| Example | Percentage kill of biomphalaria glabratus, p.p.m. | | | | |
|---|---|---|---|---|---|
|  | 12 | 10 | 2.5 | 0.6 | 0.15 |
| 1 | 0 | | | | |
| 2 | 40 | | | | |
| 3 | 100 | 20 | 0 | | |
| 4 | 100 | | 0 | | |
| 5 | 100 | | 0 | | |
| 6 | 100 | | 0 | | |
| 7 | 100 | 100 | 100 | 20 | 20 |
| 8 | 100 | 100 | 100 | 0 | |
| 9 | 100 | 100 | | | |
| 10 | 0 | | | | |
| 11 | 0 | | | | |
| 12 | 100 | 100 | 20 | 0 | |
| 13 | 0 | | | | |
| 15 | 100 | 100 | 100 | 40 | 0 |
| 16 | 100 | 100 | 0 | 0 | 0 |
| 17 | 0 | | | | |
| 18 | 0 (at 6 p.p.m.) | | | | |
| 19 | 100 | | 0 | | |
| 20 | 100 | 100 | 30 | | |
| 21 | 0 (at 6 p.p.m.) | | | | |

In the same test, compounds of U.S. Pat. 3,484,455, e.g. 2-imino-1,3-dithietane hydrochloride, 2-methylimino-1,3-dithietane, and 2-methylcarbamylimino-1,3-dithietane gave no kill of the snails at 12 p.p.m.

Certain of the 1,3-dithietanes have exhibited nematocidal activity.

For the nematode test, soil was homogeneously inoculated with a macerated blend of tomato roots heavily knotted with the root-knot nematode, *Meloidogyne hapla*. Ten ml. of the test solution was added to 200 ml. of the inoculated soil in a 16 oz. jar to give a concentration by volume of about 60 p.p.m. The jar was then shaken to insure thorough mixing and kept capped for 72 hours. The soil was then placed into a 3" plastic plant pot and allowed to air for about 24 hours after which time 3 cucumber (*Cucumis sativus*) seeds were planted. About twenty-three days thereafter, the cucumber plants were removed from the soil and the root systems examined for the presence of knots. A total of 11 knots is considered as no control (NC) and less than that as a measure of control.

Under these test conditions, the herbicidal tendencies of candidate materials are often expressed. Where cucumber seedlings fail to emerge (germinate) or emerge and then rapidly succumb due to phytotoxicity, assessment of knotting on roots is not possible. In such instances, a week prior to the scheduled observation date, an excised, healthy cucumber leaf (usually cotyledonary rather than primary leaf) is buried in the soil of the treatment. On the observation date the efficacy of the treatment is established by microscopic examination (stereo 20×) of ca. 0.5 cc. soil samples taken from the zone containing plant fragments (the above leaf, or remnants of roots, stems, leaves, and even seeds of the original sowing can be used). Ineffective treatments are thus detected by an abundance of live nematodes in water slurries of such soil samples. A measure of control is denoted by the total absence of nematodes or numbers less than 5 per sample.

Lower concentrations of example materials are obtained by using like volumes of test solutions at appropriate solution strengths.

The results of the tests are summarized in Table VI.

TABLE VI.—NEMATOCIDAL ACTIVITY

| | Number *Meloidogyne hapla* in soil or number knots on cucumber roots | | | |
|---|---|---|---|---|
| P.p.m. in soil | 60 | 30 | 15 | 8 |
| Example: | | | | |
| 1 | 0 soil | 0 soil | nc | |
| 2 | do | do | nc | |
| 3 | do | | | |
| 4 | nc | | | |
| 5 | 0 soil | nc | nc | |
| 6 | 2 soil | nc | nc | |
| 7 | nc | | | |
| 8 | nc | | | |
| 9 | nc | | | |
| 10 | nc | | | |
| 11 | nc | | | |
| 12 | 0 knots | 0 knots | 7 knots | nc |
| 13 | nc | | | |
| 15 | 0 soil | 0 knots | nc | |
| 16 | nc | | | |
| 17 | nc | | | |
| 18 | nc | | | |
| 19 | nc | | | |
| 20 | nc | | | |
| 21 | nc | | | |
| 22 | nc | | | |

The 1,3-dithietanes of this invention are biocidally active compounds, and as such, are suitable for the control of living organisms and particularly microorganisms. Representative compounds have been found to be effective algaecidal, bactericidal and fungicidal agents and are useful as industrial biocides.

One method of evaluation used was by a procedure known as an agar streak test. In this test the compounds to be examined were dissolved in an appropriate solvent and added to two sterily Petri plates in an amount necessary to provide a given concentration of the compound in parts per million (p.p.m.) when diluted with sterile trypticase broth-dextrose agar for fungi and bacteria or inorganic salts agar for algae. The compound and the agar were thoroughly mixed and allowed to harden. The agar surface was streaked with agar- or liquid-grown cultures of representative bacteria, fungi or algae. The plates were then incubated at the appropriate time, temperature and illumination for the given culture and then observed for inhibition of growth on the agar surface. The following system was employed to rate the activity of the compounds.

0 = complete inhibition
1+ = slight growth
2+ = moderate inhibition
3+ = slight inhibition
4+ = no inhibition Table VII gives the results using three bacteria *Pseudomonas aeruginosa* (*P. aerug.*), *Staphylococcus aureus* (*S. aureus*) and *Escherichia coli* (*E. coli*); three fungi *Aspergillus niger* (*A. niger*), *Rhizopus stolonifer* (Rhiz.) and *Rhodotorula rubra* (Rhod.) and three algae *Chlorella pyrenoidosa* (Chlorella), *Scenedesmus obliquus* (Scene.) and *Phormidium* spp. (Black).

The compounds of this invention may be readily utilized as algaecides, bactericides, fungicides, mildewicides, slimicides or combinations thereof in any loci by incorporating into said loci a 1,3-dithietane in an amount which is effective to control the microorganism(s) present.

One such application is the control of microorganisms in aqueous media such as water-cooling systems, swimming pools, paper pulp processes, aqueous polymer dispersions, water-based paints, and the like. For example, the compound of Example 15 at 25 p.p.m. gave excellent control of algae and slime in laboratory model cooling tower tests.

The compounds are useful biocides in other liquid media such as those used in the cosmetic, fuel, metal-working and paint industries. For example, the compound of Examples 12 and 15 were found to be effective preservatives for cutting oils at 250–1000 p.p.m. The compounds of Examples 12 and 16 were active in paint film mildewicide application tests.

The 1,3-dithietanes and compositions containing them can also function as fabric and leather preservatives, cosmetic preservatives, soap additives, sanitizing agents such as in laundry soaps and detergents, preservatives for fuels, fiber spin finish biocides and the like.

The exact amount of 1,3-dithietane required to achieve the microbiocidal effect will, of course, vary with the medium being protected or preserved, the microorganisms being controlled, the particular 1,3-dithietane or composition thereof being employed and the like. Typically, in a liquid medium, excellent control may be obtained where the 1,3-dithietane is incorporated in the range of 0.1 to 10,000 parts per million or 0.00001 to 1% based on the weight of the medium. A range of 1 to 2000 p.p.m. is preferred.

I claim:

1. A compound of the structure

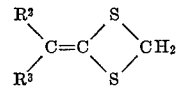

wherein $R^2$ is hydrogen, bromo, chloro, cyano, an $R^4OC(O)$-group wherein $R^4$ is a lower alkyl group, N-(3,4-dichlorophenyl)carbamyl, N-(4-dimethylaminophenyl)carbamyl or N-(4-nitrophenyl)carbamyl; when $R^2$ is hydrogen, $R^3$ is nitro or an $R^5C(O)$-group wherein $R^5$ is a lower alkyl group or a phenyl group; when $R^2$ is bromo or chloro $R^3$ is nitro; when $R^2$ is cyano $R^3$ is an $R^8OC(O)$-group wherein $R^8$ is a lower alkyl group, an $R^6NHC(O)$-group wherein $R^6$ is hydrogen or a lower alkyl group or an $R^7SO_2$ group wherein $R^7$ is phenyl, phenyl substituted with lower alkyl, lower alkoxy, halogen or nitro, or a lower alkyl group; when $R^2$ is an $R^4OC(O)$-group $R^3$ is an $R^9OC(O)$-group wherein $R^9$ is a lower alkyl group; when $R^2$ is N-(3,4-dichlorophenyl)carbamyl, N-(4-dimethylaminophenyl)carbamyl or N-(4-

TABLE VII.—CONTROL OF MICROORGANISMS (RANK IN STREAK TEST)

| | Bacteria[1] | | | Fungi[1] | | | Algae[2] | | |
|---|---|---|---|---|---|---|---|---|---|
| Ex. | P. aerug. | S. auerus | E. coli | A. niger | Rhiz. | Rhod. | Chlor. | Scene. | Black |
| 1 | 4+ | 1+ | 3+ | 0 | 0 | 0 | 1+ | 0 | 3+ |
| 4 | 4+ | 4+ | 4+ | 1+ | 0 | 3+ | 1+ | 0 | 0 |
| 5 | 4+ | 1+ | 4+ | 0 | 0 | 0 | 1+ | 0 | 2+ |
| 6 | 4+ | 1+ | 3+ | 0 | 0 | 0 | 1+ | 0 | 0 |
| 7 | 4+ | 1+ | 4+ | 2+ | 1+ | 4+ | 0 | 0 | 0 |
| 8 | 4+ | 2+ | 4+ | 0 | 0 | 2+ | 0 | 0 | 0 |
| 9 | 4+ | 3+ | 4+ | 0 | 0 | 0 | 1+ | 0 | 0 |
| 10 | 4+ | 4+ | 4+ | 1+ | 0 | 1+ | 4+ | 1+ | 4+ |
| 11 | 4+ | 3+ | 4+ | 1+ | 0 | 2+ | 4+ | 2+ | 3+ |
| 12 | 0 | 0 | 0 | 0 | 0 | 0 | 0 | 0 | 0 |
| 13 | 4+ | 4+ | 4+ | 0 | 0 | 1+ | 1+ | 4+ | 2+ |
| 14 | 4+ | 4+ | 4+ | 2+ | 2+ | 3+ | 2+ | 2+ | 3+ |
| 15 | 1+ | 0 | 0 | 0 | 0 | 0 | 0 | 0 | 0 |
| 16 | 4+ | 1+ | 4+ | 0 | 0 | 0 | 3+ | 0 | 0 |
| 17 | 4+ | 3+ | 4+ | 1+ | 1+ | 4+ | 4+ | 4+ | 1+ |
| 18 | 4+ | 3+ | 4+ | 2+ | 3+ | 4+ | 4+ | 2+ | 0 |
| 19 | 4+ | 4+ | 4+ | 1+ | 1+ | 3+ | 4+ | 3+ | 4+ |
| 20 | 4+ | 0 | 4+ | 2+ | 3+ | 4+ | 3+ | 2+ | 0 |

NOTE.—Control: [1] Concentration of compound=500 p.p.m.; [2] Concentration of compound=20 p.p.m.

nitrophenyl)carbamyl $R^3$ is arenesulfonyl wherein arene is benzene, naphthalene or benzene substituted with lower alkyl, lower alkoxy, halogen or nitro.

2. A compound of the structure

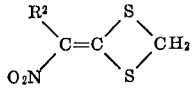

wherein $R^2$ is hydrogen, bromo or chloro.

3. A compound according to claim 2 which is 2-nitromethylene-1,3-dithietane.

4. A method for preparing a compound of the structure

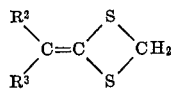

wherein $R^2$ is hydrogen, bromo, chloro, cyano, and $R^4OC(O)$-group wherein $R^4$ is a lower alkyl group, N-(3,4-dichlorophenyl)-carbamyl, N-(4-dimethylaminophenyl)carbamyl or N-(4-nitrophenyl)carbamyl; when $R^2$ is hydrogen $R^3$ is cyano, nitro or an $R^5C(O)$-group wherein $R^5$ is a lower alkyl group or a phenyl group; when $R^2$ is bromo or chloro $R^3$ is nitro; when $R^2$ is cyano $R^3$ is cyano, an $R^8OC(O)$-group wherein $R^8$ is a lower alkyl group, an $R^6NHC(O)$-group wherein $R^6$ is hydrogen or a lower alkyl group or an $R^7SO_2$ group wherein $R^7$ is phenyl, phenyl substituted with lower alkyl, lower alkoxy, halogen or nitro, or a lower alkyl group; when $R^2$ is an $R^4OC(O)$-group $R^3$ is an $R^9OC(O)$-group wherein $R^9$ is a lower alkyl group; when $R^2$ is N-(3,4-dichlorophenyl)carbamyl, N-(4-dimethylaminophenyl)carbamyl or N-(4-nitrophenyl)carbamyl $R^3$ is arenesulfonyl wherein arene is benzene, naphthalene or benzene substituted with lower alkyl, lower alkoxy, halogen or nitro, which comprises reacting a compound of the structure

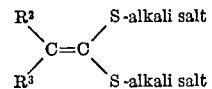

with chloromethyl thiocyanate.

5. A method according to claim 4 for preparing 2-nitromethylene-1,3-dithietane.

6. A method according to claim 4 for preparing said compound wherein $R^3$ is $NO_2$ and $R^2$ is hydrogen, bromo or chloro.

References Cited
UNITED STATES PATENTS 3,322,788   5/1967   Gompper et al. ____ 260—327 M

OTHER REFERENCES

Addor, J. Heterocyclic Chemistry, vol. 7, pp. 381–387 (April 1970).

Houben-Weyl, Methoden der Organischen Chemie, 4th ed., vol. 9, pp. 794–796 and 866, Georg Thieme Verlag, Stuttgart, Germany (1955).

JOHN D. RANDOLPH, Primary Examiner

U.S. Cl. X.R.

260—240 R, 247.1, 293.68, 293.85, 326.82; 424—277

UNITED STATES PATENT OFFICE
CERTIFICATE OF CORRECTION

Patent No. 3,772,331　　　　　　　　　Dated November 13, 1973

Inventor(s) Stanley A. Greenfield

It is certified that error appears in the above-identified patent and that said Letters Patent are hereby corrected as shown below:

In the specification make the following changes:

Column 1, line 47, "$R^8$" should read --$R^9$--.

Column 2, line 10, "$R_4$" should read --$R^4$--.

Column 2, line 16, "$R^4$" should read --$R^8$--.

Signed and sealed this 30th day of April 1974.

(SEAL)
Attest:

EDWARD M.FLETCHER,JR.　　　　　　C. MARSHALL DANN
Attesting Officer　　　　　　　　　Commissioner of Patents